O. GREEN.
SIGNALING DEVICE FOR RAILROADS.
APPLICATION FILED FEB. 27, 1922.
1,423,318.
Patented July 18, 1922.
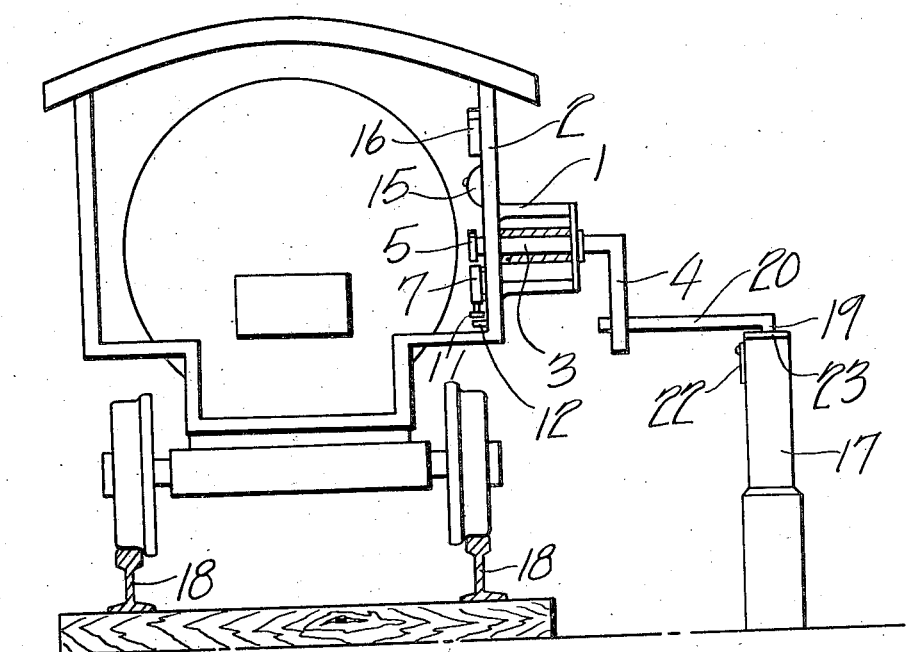
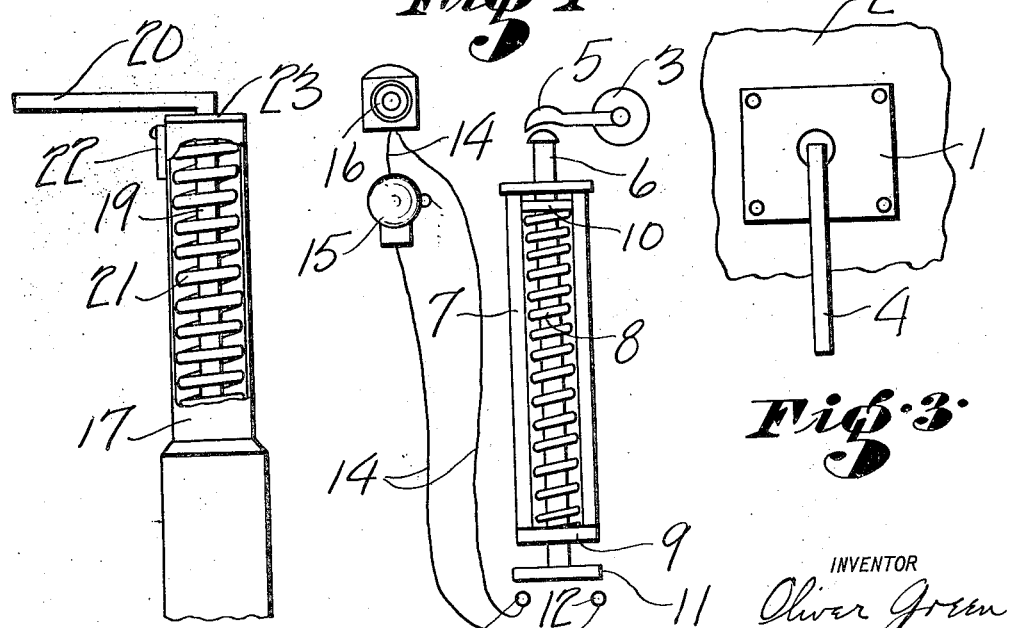
INVENTOR
Oliver Green
BY
Adam E. Fisher
ATTORNEY

UNITED STATES PATENT OFFICE.

OLIVER GREEN, OF MICHIGAN CITY, INDIANA.

SIGNALING DEVICE FOR RAILROADS.

1,423,318.  Specification of Letters Patent.  Patented July 18, 1922.

Application filed February 27, 1922. Serial No. 539,408.

*To all whom it may concern:*

Be it known that I, OLIVER GREEN, a citizen of the United States, residing in Michigan City, State of Indiana, have invented new and useful Improvements in Signaling Devices for Railroads, of which the following is a specification, reference being had to the accompanying drawings.

This invention is a signaling device for railroad use; and the object is to provide a practical apparatus for warning a locomotive engineer, both by electric bell and red light, of his entrance into any danger area, or into a closed "block" where the block system is employed.

In the drawings:

Figure 1 is a rear elevation, showing the elements of the device as associated with a locomotive and track.

Figure 2 is a detail of the track post, a section being broken out to show the shock absorbing spring inside.

Figure 3 is a detail of the contact mechanism, housing and contact arm as mounted on the outside of the engine cab.

Figure 4 is a detail of the contact elements mounted inside the cab.

The invention consists of a housing 1 mounted on the outside of the locomotive cab 2. A shaft 3 is journaled through this housing, the outer end having a contact arm 4 depending therefrom, and the inner end being extended through into the cab and having attached at that end a depressor arm 5, adapted on the rotation of the shaft 3 to depress the contact pin 6, which is slidingly mounted in the guide 7. This guide 7 is secured to the inner side of the cab. The contact pin 6 is normally held in its uppermost position by the coil spring 8 through which the pin 6 passes, the said spring being braced between the base 9 of the guide 7 and the stop 10 at the upper end of the pin. The lower end of the pin 6 carries an insulated contact strip 11 adapted to bridge and electrically connect the contacts 12 and 13 in the electrical circuit 14, whereby the bell 15 is rung and the red light 16 is shown.

A hollow post 17 is mounted alongside the track 18, and in this is rotatively mounted a bar 19 with a horizontal contact arm 20 adapted to turn in a horizontal plane and to be set perpendicularly toward the track so as to be impinged by the contact arm 4 as the locomotive passes along the track. A shock spring 21 surrounds the bar 19 inside the post 17, so as to relieve the apparatus of the effect of the sudden coming together of the two arms when the apparatus is in set position. A latch 22 is provided to hold the arm 20 in a position parallel to the track when desired, so as not to be struck by the arm 4 as the locomotive passes. A cover plate 23 on the top of the post prevents ice or snow from accumulating on the apparatus so as to prevent its working.

The operation of the device is obvious from the foregoing description.

While I have herein described a certain specific method of constructing and assembling the elements of my invention, it is understood that same may be varied in minor details, not departing from the spirit of my invention as defined in the appended claim.

I claim:

A signaling device for railway locomotives, comprising a casing outside the locomotive cab; a shaft journaled through the casing, the outer end having a depending contact arm and the inner end a depressor arm; a guide mounted inside the cab; a spring set contact pin slidingly mounted in the guide beneath the depressor arm; an insulated contact strip at the lower end of the contact pin; an electrical circuit embodying a bell and red light and two contacts adapted to be closed by the contact strip on the depression of the contact pin; and an adjustable arm mounted alongside the track and adapted to be impinged by the contact arm extended from the cab.

OLIVER GREEN.

Witnesses:
 M. W. ELLIS,
 ALLEN J. SNOOK,